(12) United States Patent
Chuang et al.

(10) Patent No.: US 8,362,750 B2
(45) Date of Patent: Jan. 29, 2013

(54) APPARATUS FOR PREVENTING CAPACITOR CHARGER FROM OVERCHARGING AND METHOD THEREOF

(75) Inventors: Ming-Nan Chuang, Hsin-Chu (TW); Yi-Shan Chu, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 548 days.

(21) Appl. No.: 12/205,907

(22) Filed: Sep. 7, 2008

(65) Prior Publication Data

US 2009/0001939 A1  Jan. 1, 2009

Related U.S. Application Data

(62) Division of application No. 11/306,857, filed on Jan. 13, 2006, now Pat. No. 7,446,506.

(51) Int. Cl.
*H02J 7/00* (2006.01)
(52) U.S. Cl. ........ 320/166; 320/140; 320/157; 320/161; 320/162; 320/167
(58) Field of Classification Search .................. 320/148, 320/166
See application file for complete search history.

(56) References Cited

U.S. PATENT DOCUMENTS

| | | | | |
|---|---|---|---|---|
| 6,097,177 A | * | 8/2000 | Sudo et al. | 320/136 |
| 6,127,810 A | * | 10/2000 | Sato et al. | 320/148 |
| 7,045,990 B2 | | 5/2006 | Takimoto et al. | |
| 7,272,025 B2 | * | 9/2007 | Hawley | 363/49 |
| 2003/0197487 A1 | * | 10/2003 | Tamura et al. | 320/114 |
| 2005/0237032 A1 | * | 10/2005 | Tan et al. | 320/166 |

FOREIGN PATENT DOCUMENTS

| | | |
|---|---|---|
| JP | 2004-112897 | 4/2004 |
| TW | I242903 | 11/2005 |

\* cited by examiner

*Primary Examiner* — Edward Tso
*Assistant Examiner* — Johali Torres Ruiz
(74) *Attorney, Agent, or Firm* — Winston Hsu; Scott Margo

(57) ABSTRACT

An apparatus for controlling a charging circuit is provided. The apparatus includes a first detector, a second detector, and a controller. The first detector detects a voltage level at a first time and generates a first indication value corresponding to the voltage level at the first time, where the voltage level corresponds to an output voltage of the charging circuit. The second detector detects the voltage level at a second time after the first time and generates a second indication value corresponding to the voltage level at the second time. The controller receives the first and second indication values, and generates a control signal according to the first and second indication values for turning the charging circuit on and off.

7 Claims, 5 Drawing Sheets

APPARATUS FOR PREVENTING CAPACITOR CHARGER FROM OVERCHARGING AND METHOD THEREOF

CROSS REFERENCE TO RELATED APPLICATIONS

This divisional application claims the benefit of co-pending U.S. patent application Ser. No. 11/306,857, filed on Jan. 13, 2006 and included herein by reference.

BACKGROUND OF THE INVENTION

1. Field of the Invention

The present invention relates to a charger, in particular, an apparatus which prevents a charger from overcharging a capacitor.

2. Description of the Prior Art

Please refer to FIG. 1. FIG. 1 shows a prior art charger 100. The charger 100 includes a charging circuit 110, a voltage divider 120, a capacitor 130, a comparator 140, and a controller 150. The voltage divider 120 is not restricted to connect to the cathode of the rectifying diode 118, but could connect to the anode of the rectifying diode. The charging circuit 110 contains a transformer 112, which receives an input voltage $V_{in}$. A low level input voltage $V_{in}$ is stepped up to a high level voltage by the transformer 112, and the high voltage passes through the rectifying diode 118 to charge the capacitor 130. The voltage at the terminal of the capacitor 130 is used as the output voltage for the charger 100. The on/off state of the transformer 112 is controlled by a MOSFET 116, which is driven by a driver 114. The driver 114 receives a control signal from the controller 150 and provides the MOSFET 116 with a driving voltage. The charging circuit 110 is of a Flyback configuration. The voltage divider 120 includes two resistors $R_1$ and $R_2$ connected in series. The voltage drop on the resistor $R_2$ is a fraction of the output voltage $V_{out}$, and is regarded as a feedback voltage $V_{FB}$. The feedback voltage $V_{FB}$ is compared with a predetermined reference voltage $V_{ref}$ by the comparator 140. The controller 150 generates the control signal based on the result given by the comparator 140.

The example below further illustrates the functions of the charger 100. For the flash operation of a camera, an input voltage of 3V is transformed into a high voltage to charge the capacitor 130. Since the flash requires a driving voltage as high as 300V, the target voltage of the capacitor 130 is set to 300V. The ratio of $R_2/R_1$ is set to 1/299, and the reference voltage $V_{ref}$ is set to 1V. After receiving an enable signal, the controller 150 sends the control signal to the driver 114, and the charging circuit 110 starts charging the capacitor 130. As the voltage of the capacitor 130 increases and moves towards the target voltage of 300V, the feedback voltage $V_{FB}$ moves towards a voltage of 1V, which is equal to the reference voltage $V_{ref}$. When the voltage of the capacitor 130 is charged to 300V, the feedback voltage $V_{FB}$ is therefore equal to 300×[1/(1+299)]=1 V. Once the feedback voltage $V_{FB}$ reaches the reference voltage $V_{ref}$, the comparator 140 sends an indication signal to the controller 150. As soon as the indication signal is received, the controller 150 sends the control signal to stop the driver 114 and turn off the charging circuit 110. A ready signal indicating the full charge of the capacitor 130 is also sent out. As a result, the capacitor 130 can be carefully charged to capacity. However, if the resistor $R_1$ is open-circuited or the resistor $R_2$ is shorted, the controller 150 will never receive the indication signal from the comparator 140 because the feedback voltage $V_{FB}$ will never reach 1 V. Therefore, the capacitor 130 will be overcharged and may face potential risks of high voltage damage to other components.

SUMMARY OF THE INVENTION

One objective of the claimed invention is to therefore provide an apparatus for controlling a charging circuit and a method to solve the above-mentioned problems.

According to one aspect of the present invention, an apparatus for controlling a charging circuit is provided. The apparatus includes a first detector, a second detector, and a controller. The first detector detects a voltage level at a first time and generates a first indication value corresponding to the voltage level at the first time, where the voltage level corresponds to an output voltage of the charging circuit. The second detector detects the voltage level at a second time after the first time and generates a second indication value corresponding to the voltage level at the second time. The controller receives the first and second indication values, and generates a control signal according to the first and second indication values for turning the charging circuit on and off.

According to another aspect of the present invention, a method for controlling a charging circuit is provided. The method includes: detecting a voltage level at a first time and generating a first indication value corresponding to the voltage level at the first time, the voltage level corresponding to an output voltage of the charging circuit; detecting the voltage level at a second time after the first time and generating a second indication value corresponding to the voltage level at the second time; and generating a control signal according to the first indication value and the second indication value for turning the charging circuit on and off.

According to yet another aspect of the present invention, an apparatus for controlling a charging circuit is provided. The apparatus includes a first detector, a comparator, and a controller. The first detector detects a voltage level of a feedback voltage at a first time and generates a first indication signal corresponding to the voltage level at the first time, where the feedback voltage represents an output voltage of the charging circuit. The comparator detects whether the feedback voltage has reached a target level and outputs a terminal signal accordingly. The controller receives the first indication signal and the terminal signal to generate a control signal for turning the charging the charging circuit on and off.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
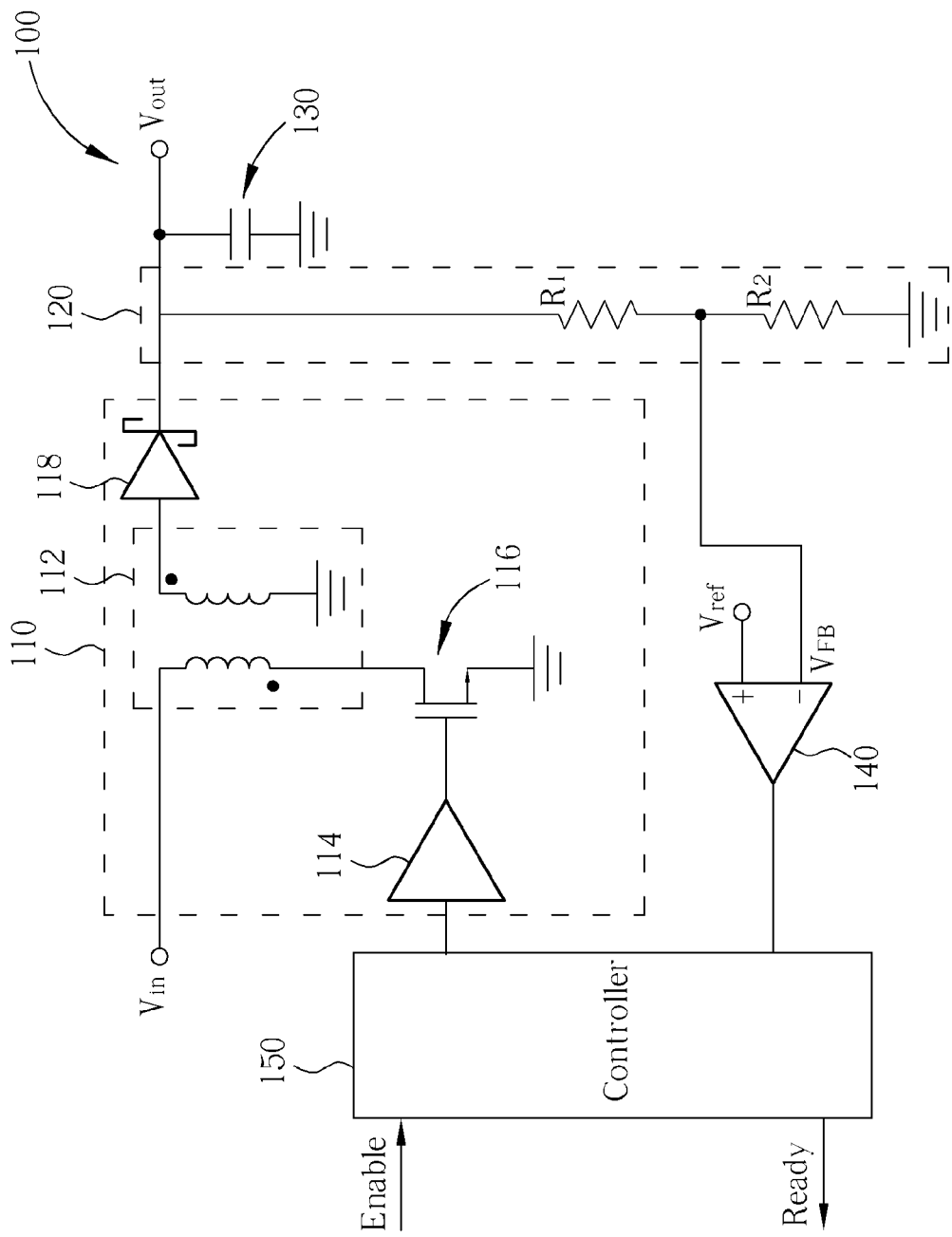
FIG. 1 shows a charger according to the prior art.
Figure 2:
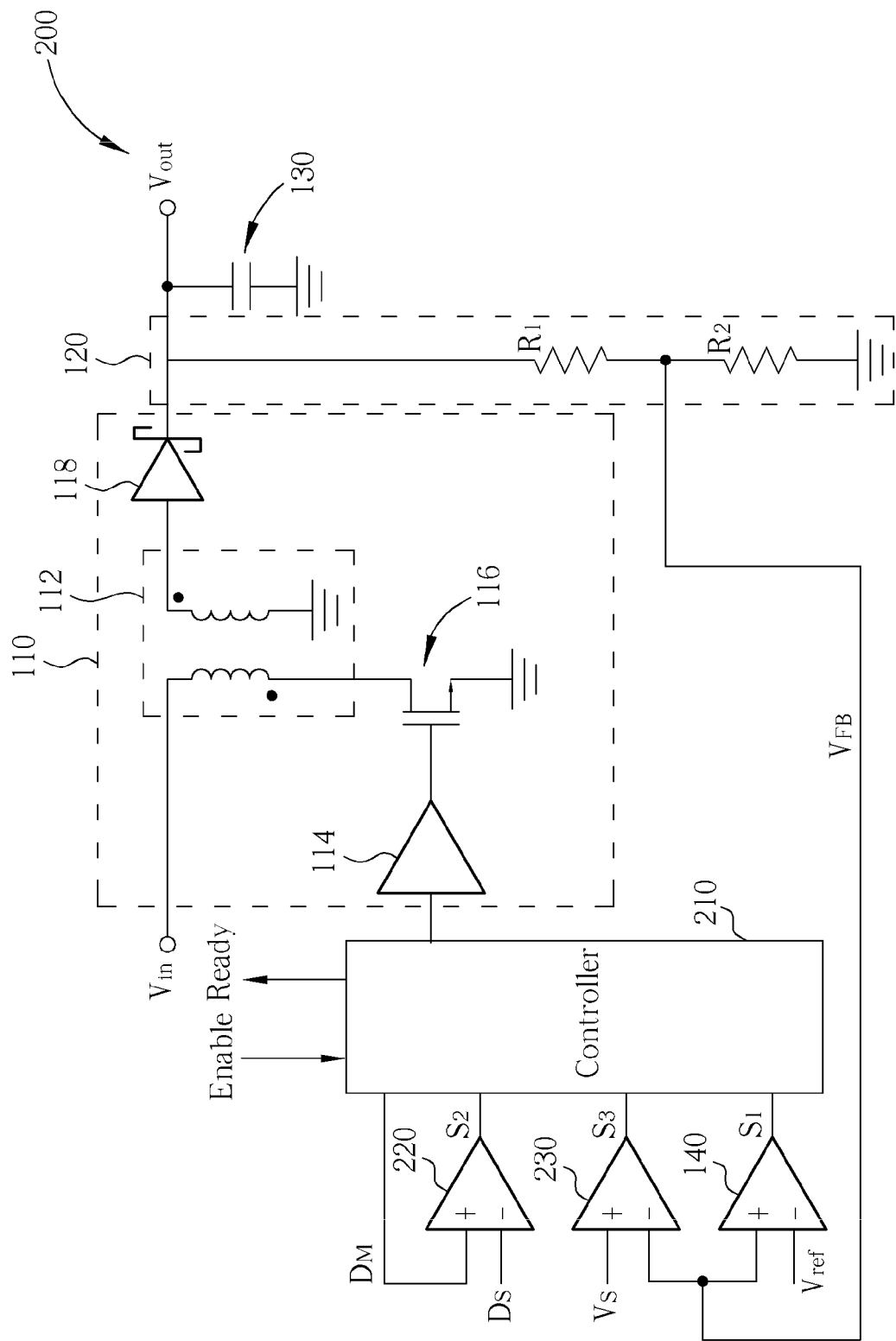
FIG. 2 shows a charger according to a first embodiment of the present invention.

Please refer to FIG. 2. FIG. 2 shows a charger 200 according to a first embodiment of the present invention. The charger 200 includes a charging circuit 110, a voltage divider 120, a capacitor 130, a first comparator 140, a controller 210, a second comparator 220, and a third comparator 230. The charging circuit 110, the voltage divider 120, the capacitor 130, and the first comparator 140 are functionally identical to those components corresponding to the same schematic symbol as shown in FIG. 1. The comparators 220 and 230 can be implemented through operational amplifiers. In this embodiment, the controller 210 not only generates a control signal to control the charging circuit 110, but also provides a control value $D_M$. The control value $D_M$ is generated by monitoring the duty cycle of the control signal. The second comparator 220 compares the control value $D_M$ with a predetermined threshold value $D_S$, and generates a corresponding indication signal $S_2$. The third comparator 230 compares the feedback voltage $V_{FB}$ with a predetermined threshold voltage level $V_S$ and generates a corresponding indication signal $S_3$. The controller 210 sends out the control signal to control the charging circuit 110, according to indication signals $S_1$, $S_2$, and $S_3$. The indication signal $S_1$ is generated by the first comparator 140.

Figure 3:
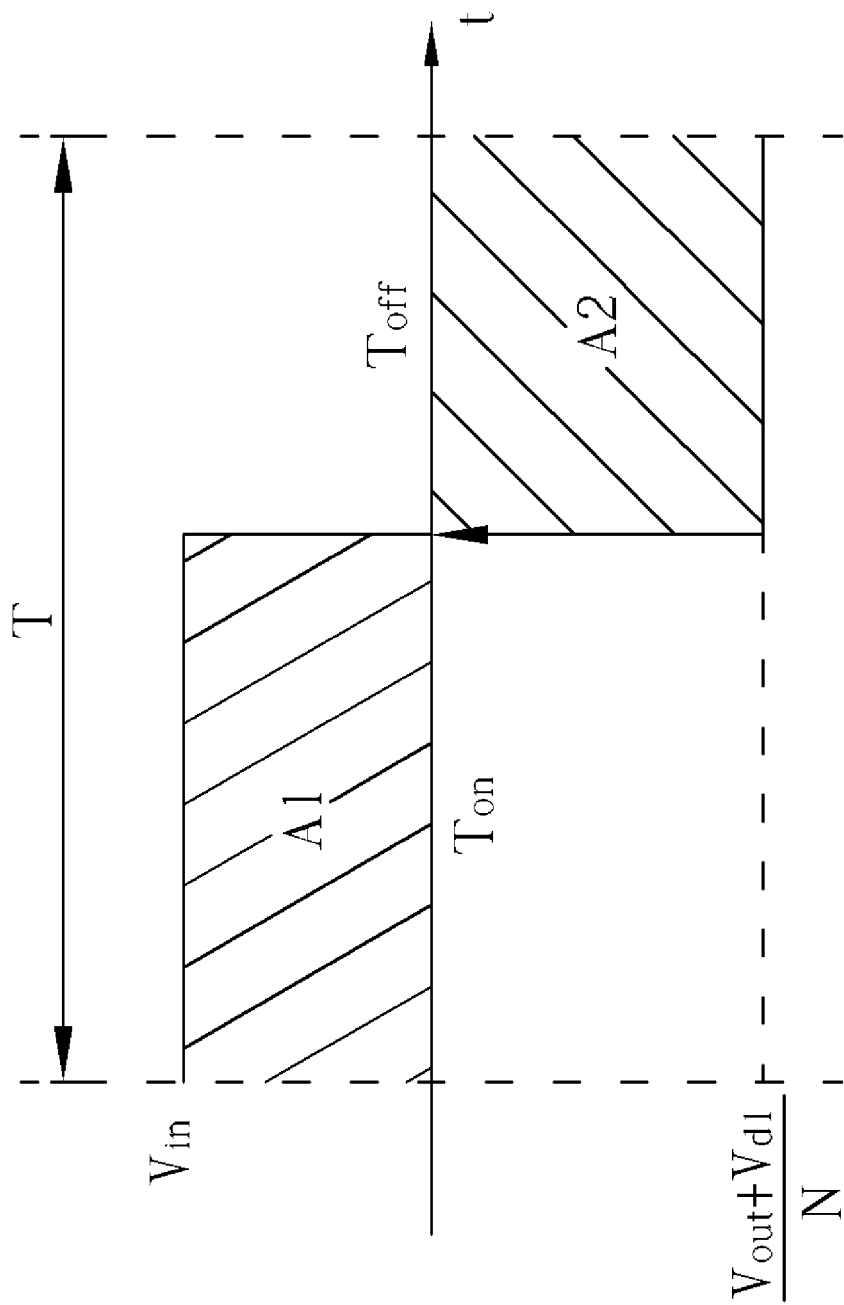
FIG. 3 shows a waveform of the control signal within one period (T).

The function of the controller 210 is described below. Because the charger 200 is of a Flyback configuration, the time-average voltage of the transformer 112 within an entire period is equal to zero when under a stable operating condition. Please refer to FIG. 3. FIG. 3 shows a waveform of the control signal within one period (T). The output voltage $V_{out}$ and the input voltage $V_{in}$ satisfy Eq (1).

$$\left(\frac{V_{out} + V_{d1}}{N}\right) \times T_{off} = V_{in} \times T_{on}, \quad \text{Eq. (1)}$$

$$DutyCycle = \frac{Ton}{Ton + Toff} \quad \text{Eq. (2)}$$

where $V_{d1}$ is the voltage drop on the rectifying diode 118, N is the transformer turn ratio (N=Ns/Np, Ns:Secondary turns, Np:Primary turns), and $T_{on}$ and $T_{off}$ are the respective on time and off time of the control signal within one period. $V_{d1}$ is about 0.5V~1 V and is usually neglected. From Eq. (1) and Eq. (2), it is obvious that the higher the output voltage $V_{out}$, the higher the duty cycle of the control signal. Moreover, in FIG. 3 the product of the on time $T_{on}$ and the voltage $V_{in}$, i.e. the area A1, must be equal to product of the off time $T_{off}$ and the voltage $(V_{out}+V_{d1})/N$, i.e. the area A2. Assuming that N=20, $V_{in}$=3V, $T_{on}$=3.3 μs, when the output voltage $V_{out}$ is charged to an amount of 100V, the off time $T_{off}$ is equal to 1.98 μs. This implies that the duty cycle (i.e., the control value $D_M$) of the control signal is equal to 62.5%. If the control value $D_M$ is equal to 62.5%, the feedback voltage $V_{FB}$ should be 100× [1/(1+299)]=0.333V with the ratio of $R_2/R_1$ equal to 1/299. Consequently, the threshold voltage level $V_S$ is set to 0.333V. Therefore, when the indication signal $S_2$ generated by the second comparator 220 indicating that the control value $D_M$ has reached the threshold value $D_S$, and the indication signal $S_3$ generated by the third comparator 230 indicating that the feedback voltage $V_{FB}$ has not reached the threshold voltage level $V_S$, the controller 210 will send the control signal to disable the charging circuit 110. However, sometimes the input voltage $V_{in}$ is smaller than its normal voltage level, and hence the threshold voltage level $V_S$ should be modified. The threshold voltage level $V_S$ should obey the following equation.

$$V_S < \left(\frac{R_2}{R_1 + R_2}\right) \times N \times V_{in}(\min) \times \left(\frac{D_S}{1 - D_S}\right), \quad \text{Eq. (3)}$$

where $V_{in}(\min)$ is the possible minimum voltage of the input voltage $V_{in}$. If the $V_{in}(\min)$ is equal to 1.8V, and the threshold value $D_S$ is set to be 62.5%, then $V_S$ should be set to smaller than 0.2V. A reasonable value of 0.075V is selected as the threshold voltage level $V_S$. As described in this example, once the control value $D_M$ reaches the threshold value $D_S$ (62.5% in this example) while the feedback voltage $V_{FB}$ is still smaller than the threshold voltage level $V_S$ (0.075V in this example), operation of the voltage divider 120 is regarded as abnormal, and the charging circuit 110 is disabled. Consequently, by monitoring the feedback voltage $V_{FB}$ and the duty cycle $D_M$ of the control signal, the capacitor 130 can avoid being overcharged if $R_1$ is open-circuited, or $R_2$ is shorted, or even both.

Figure 4:
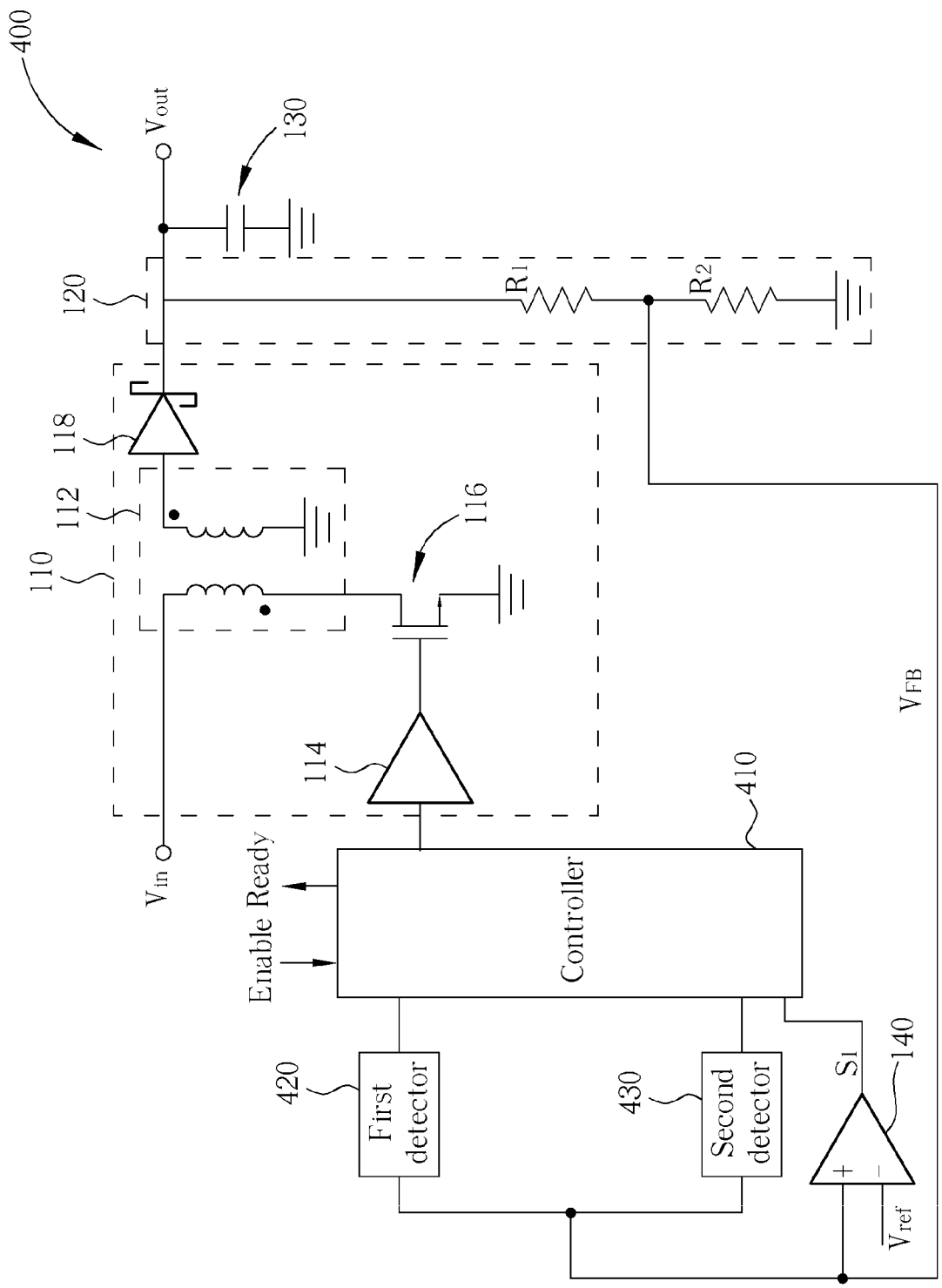
FIG. 4 shows a charger according to a second embodiment of the present invention.
Figure 5:
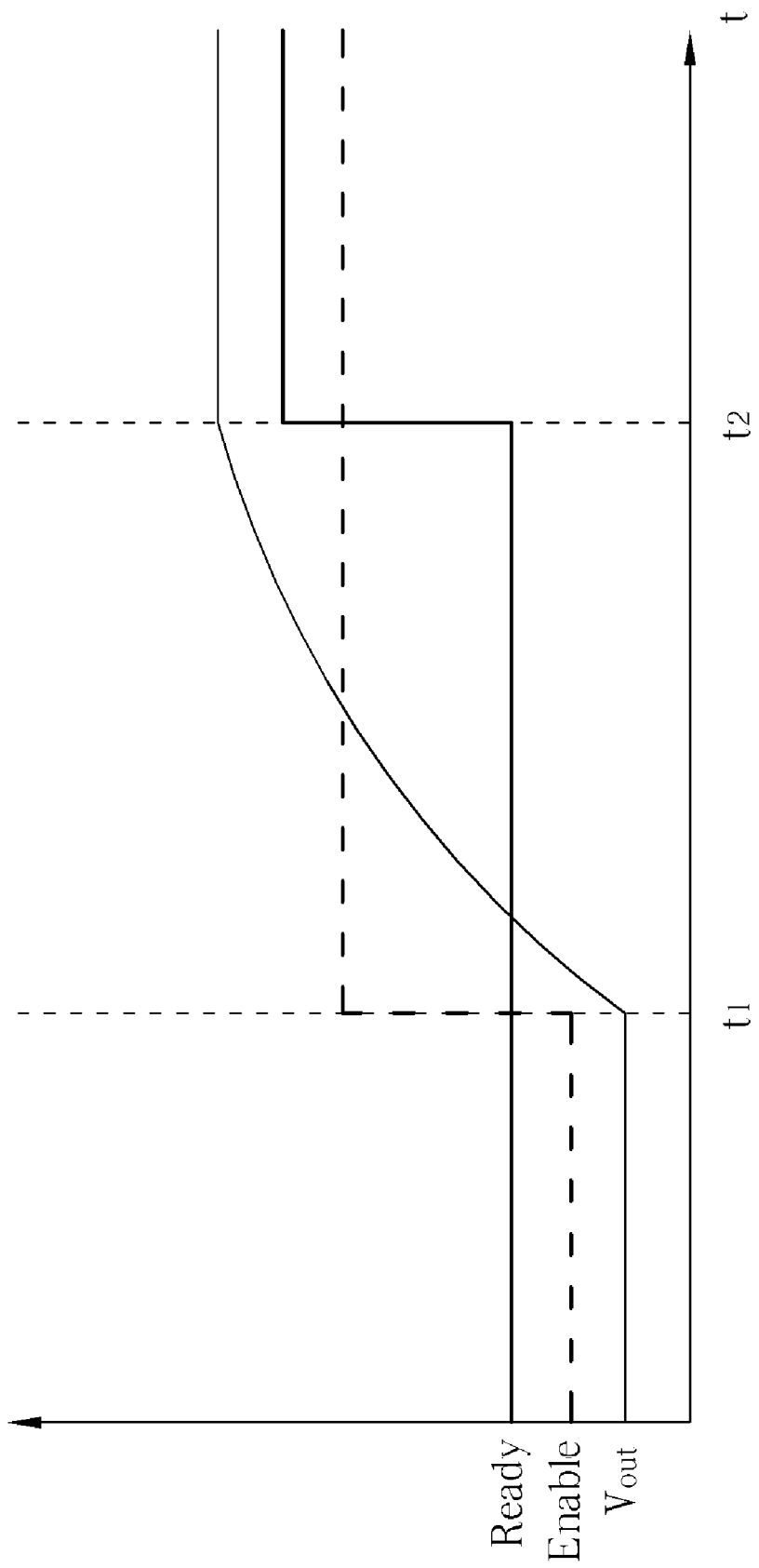
FIG. 5 shows waveforms of the output voltage $V_{out}$ and enable and ready signals during charging.

Please refer to FIG. 4. FIG. 4 shows a charger 400 according to a second embodiment of the present invention. In addition to having a charging circuit 110, a voltage divider 120, a capacitor 130, and a comparator 140, which are all functionally similar to those components having the same schematic symbol in FIG. 1, the charger 400 includes a controller 410, a first detector 420, and a second detector 430. Please refer to FIG. 5. FIG. 5 shows a waveform plot of the output voltage $V_{out}$, and the enable and ready signals during charging. At time t1, when the enable signal (dashed line) received by controller 410 rises up, the charging circuit 110 will be turned on by the control signal output from the controller 410. The output voltage $V_{out}$ (thin solid line) will then start increasing. At time t2, when the output voltage $V_{out}$ reaches a target level, the ready signal (thick solid line) goes from a low logic level to a high logic level, and the controller 410 sends out the control signal to disable the charging circuit 110 according to the indication signal $S_1$ generated by the comparator 140.

From inspection of the output voltage $V_{out}$, it is obvious that the curve is a monotonic increasing curve, meaning that if the output voltage $V_{out}$ is sampled, a latter-sampled value is definitely larger than a previously-sampled value. According to this characteristic, an abnormal charging process can be detected by monitoring the output voltage $V_{out}$. Referring back to FIG. 4, the feedback voltage $V_{FB}$ is fed into the first detector 420 and the second detector 430. The first detector 420 detects the feedback voltage $V_{FB}$ at a first time and generates a first indication value. The first indication value represents the detected feedback voltage $V_{FB}$ at the first time. Afterwards, The second detector 430 detects the feedback voltage $V_{FB}$ at a second time, which is behind the first time, and generates a second indication value. The second indication value represents the detected feedback voltage $V_{FB}$ at the second time. The first indication value and the second indication value are sent to the controller 410. The controller 410 then compares these two indication values and generates the control signal accordingly. According to the characteristic of the output voltage $V_{out}$, the second indication value is typically larger than the first indication value. Therefore, if the second indication value is smaller than the first indication value, the controller 410 sends a control signal to disable the charging circuit 110. Consequently, by detecting and comparing the feedback voltage $V_{FB}$, the capacitor 130 can avoid overcharging if $R_1$ is open-circuited, or $R_2$ is shorted, or even both.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for controlling a charging circuit to charge a capacitor, the apparatus comprising:
   a first detector coupled to the charging circuit, the first detector for detecting a voltage level at a first time during charging the capacitor and generating a first indication value corresponding to the voltage level at the first time, wherein the voltage level corresponds to an output voltage of the charging circuit;
   a second detector coupled to the charging circuit, the second detector for detecting the voltage level at a second time after the first time and generating a second indication value corresponding to the voltage level at the second time during charging the capacitor; and
   a controller coupled to the charging circuit, the first detector, and the second detector, the controller for receiving the first and second indication values, and further for generating a control signal according to the first and second indication values for turning the charging circuit off, wherein the controller generates the control signal to disable the charging circuit when the first indication value is greater than the second indication value.

2. The apparatus of claim 1, wherein each voltage level is a fraction of the output voltage of the charging circuit.

3. The apparatus of claim 1, wherein the charging circuit has a Flyback configuration.

4. A method for controlling a charging circuit to charge a capacitor, the method comprising:
   detecting a voltage level at a first time and generating a first indication value corresponding to the voltage level at the first time during charging the capacitor, the voltage level corresponding to an output voltage of the charging circuit;
   detecting the voltage level at a second time after the first time and generating a second indication value corresponding to the voltage level at the second time during charging the capacitor; and
   generating a control signal according to the first indication value and the second indication value for turning the charging circuit off, wherein when the first indication value is greater than the second indication value, the control signal disables the charging circuit.

5. The method of claim 4, wherein each voltage level is a fraction of the output voltage of the charging circuit.

6. The method of claim 4, wherein the charging circuit has a Flyback configuration.

7. An apparatus for controlling a charging circuit to charge a capacitor, comprising:
   a first detector coupled to the charging circuit, for detecting a voltage level of a feedback voltage at a first time and generating a first indication signal corresponding to the voltage level at the first time during charging the capacitor, wherein the feedback voltage represents an output voltage of the charging circuit;
   a second detector coupled to the charging circuit, for detecting the voltage level at a second time after the first time and generating a second indication signal corresponding to the voltage level at the second time;
   a controller coupled to the charging circuit and the first detector, the controller receiving the first indication signal or a terminal signal to generate a control signal for turning the charging circuit off, wherein the controller disables the charging circuit when the voltage level represented by the first indication signal is greater than the voltage level represented by the second indication signal; and
   a comparator coupled to the first detector and the controller, for detecting whether the voltage level of the feedback voltage has reached a target level and outputting the terminal signal accordingly.

* * * * *